(12) United States Patent
Kovach et al.

(10) Patent No.: US 9,559,788 B2
(45) Date of Patent: Jan. 31, 2017

(54) SYSTEMS AND METHODS FOR COMMUNICATING DATA THROUGH AN ELECTROMAGNETIC BARRIER

(75) Inventors: Daniel James Kovach, Renton, WA (US); Gary E. Georgeson, Tacoma, WA (US); Andrew M. Robb, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 959 days.

(21) Appl. No.: 13/313,804

(22) Filed: Dec. 7, 2011

(65) Prior Publication Data

US 2013/0148472 A1 Jun. 13, 2013

(51) Int. Cl.
*H04B 11/00* (2006.01)

(52) U.S. Cl.
CPC ..................... *H04B 11/00* (2013.01)

(58) Field of Classification Search
CPC ....................................................... H04B 11/00
See application file for complete search history.

(56) References Cited

U.S. PATENT DOCUMENTS

| 5,437,178 A * | 8/1995 | Esin et al. ............... 73/1.82 |
| 5,982,297 A | 11/1999 | Welle |
| 8,912,709 B2 * | 12/2014 | Pollock et al. ........... 310/334 |
| 2007/0167133 A1 * | 7/2007 | Tomlinson et al. ........ 455/39 |
| 2010/0003503 A1 | 1/2010 | Seppala et al. |
| 2010/0026560 A1 * | 2/2010 | Xia ..................... G01S 3/74 342/173 |
| 2010/0090828 A1 * | 4/2010 | Blanchard ............ 340/539.26 |
| 2011/0132658 A1 | 6/2011 | Miller, II et al. |
| 2011/0133865 A1 | 6/2011 | Miller, II et al. |
| 2014/0016558 A1 * | 1/2014 | Lawry ............... H04L 5/0046 370/328 |

FOREIGN PATENT DOCUMENTS

| EP | 2293468 A1 | 3/2011 |
| GB | 2117948 A | 10/1983 |
| WO | 2005093976 A1 | 10/2005 |
| WO | 2007047701 A3 | 4/2007 |
| WO | WO 2011027093 A1 * | 3/2011 |
| WO | 2011137375 A2 | 11/2011 |

OTHER PUBLICATIONS

Coxworth http://www.gizmag.com/ultrasonic-data-and-power-transmission-through-metal/18097/, pp. 1-7, Mar. 9, 2011.*
UK Search and Examination Report for Application No. GB1221760.0; May 30, 2013; 6 pages.
English Translation of Notification of First Office Action for Chinese Application No. 201210520169.0, Dec. 7, 2015, 10 pages.
Canadian Office Action for Patent Application No. 2792208, Aug. 15, 2016, 5 pages.

* cited by examiner

*Primary Examiner* — Luke Ratcliffe
*Assistant Examiner* — Hovhannes Baghdasaryan
(74) *Attorney, Agent, or Firm* — Armstrong Teasdale LLP

(57) ABSTRACT

An electromagnetic barrier includes a first surface and a second surface. A first transducer is coupled to the first surface. A second transducer is coupled to the second surface such that a signal is transmittable between the first transducer and the second transducer without physically penetrating the electromagnetic barrier.

20 Claims, 5 Drawing Sheets

SYSTEMS AND METHODS FOR COMMUNICATING DATA THROUGH AN ELECTROMAGNETIC BARRIER

BACKGROUND

The present disclosure relates generally to communication systems and, more particularly, to methods and systems for use in communicating data through electromagnetic barriers.

Known aircraft systems are increasingly being fabricated from metallic and/or composite materials. At least some of such materials, such as carbon fiber reinforced plastic (CFRP), act as barriers to electromagnetic waves and, thus, inhibit at least some modes of communication. To enable communication across and/or through such materials, at least some communication systems route wiring through the material to couple components together and/or use dielectric windows to enable radiation to pass through. The penetrations in the material and/or dielectric windows, however, create potential leak paths and, as such, such areas must undergo frequent inspection.

Moreover, during operation, at least some wiring may be exposed to high current impulses as a result of equipment failure and/or a lightning strike, for example. Such high current impulses may lead to sparking, which could lead to undesirable results. As such, at least some known communication systems include lightning protection systems that are designed to prevent possible fuel ignition sources. However, known lightning protection systems are often cumbersome and/or are expensive to implement and/or maintain.

BRIEF SUMMARY

In one aspect, a method is provided for use in communicating through an electromagnetic barrier. The method includes coupling a first transducer to a first surface of the electromagnetic barrier and coupling a second transducer to a second surface of the electromagnetic barrier. A signal is transmitted between the first transducer and the second transducer without physically penetrating the electromagnetic barrier.

In another aspect, a communication device is provided for use in communicating through an electromagnetic barrier. The communication device includes a first transducer coupled to a first surface of the electromagnetic barrier. A second transducer is coupled to a second surface of the electromagnetic barrier such that a signal is transmitted between the first transducer and the second transducer without physically penetrating the electromagnetic barrier.

In yet another aspect, a system is provided. The system includes an electromagnetic barrier including a first surface and a second surface. A first transducer is coupled to the first surface. A second transducer is coupled to the second surface such that a signal is transmittable between the first transducer and the second transducer without physically penetrating the electromagnetic barrier.

The features, functions and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to communication systems and, more particularly, to methods and systems for use in communicating data through electromagnetic barriers. In one embodiment, the electromagnetic barrier includes a first surface and a second surface. A first transducer is coupled to the first surface, and a second transducer is coupled to the second surface. In such an embodiment, a signal, e.g., an acoustic wave, is transmittable between the first transducer and the second transducer without requiring a physical penetration through the electromagnetic barrier. That is, the electromagnetic barrier does not include an opening, gap, crack, break and/or window proximate to the transducers that enable the transducers to communicate via wiring and/or electromagnetic waves that pass through the electromagnetic barrier. In other words, the electromagnetic barrier proximate to or near the transducers is substantially solid and/or prevents electromagnetic waves from passing through. In such an embodiment, the acoustic wave may be used to transmit information and/or electric power. As such, the subject matter described herein facilitates eliminating the need to penetrate and/or to transmit power through the electromagnetic barrier.

An element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
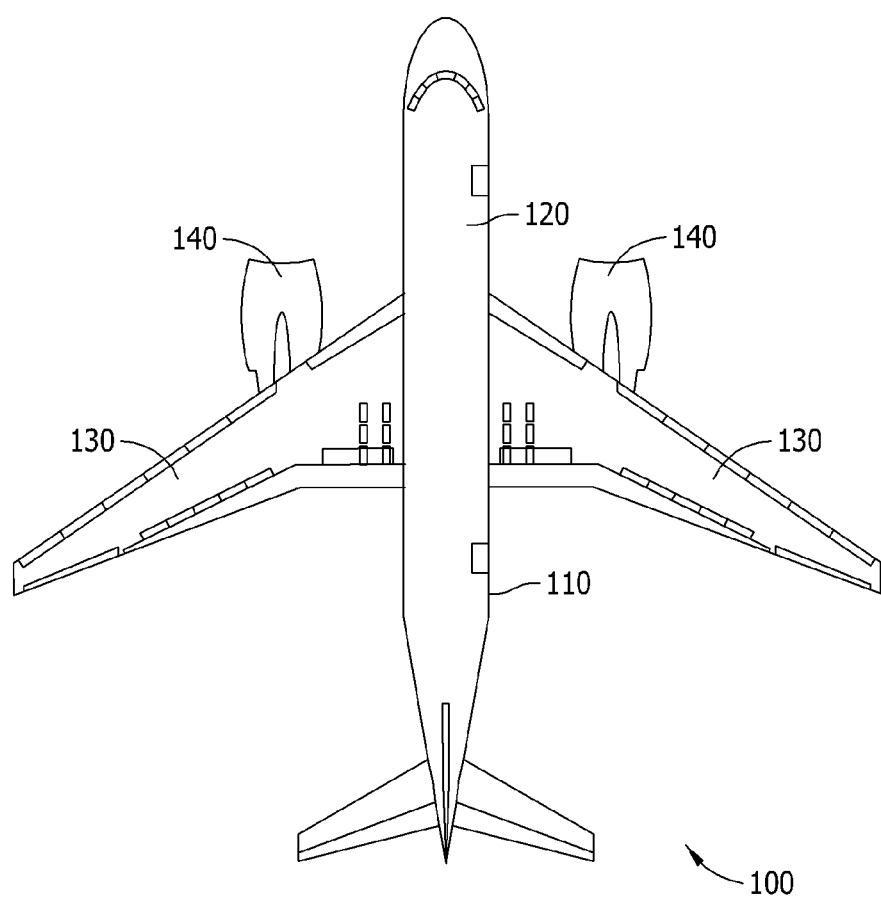
FIG. 1 is a plan view of an exemplary aircraft.

FIG. 1 is a plan view of an exemplary aircraft 100. In the exemplary embodiment, aircraft 100 includes a body 110 that includes a fuselage 120 and a pair of wings 130 extending from fuselage 120. In the exemplary embodiment, at least one engine 140 is coupled to each wing 130 to provide thrust to aircraft 100. Aircraft 100 may include any number of engines 140 that enables aircraft 100 to function as described herein. In the exemplary embodiment, each wing 130 includes at least one fuel system (not shown) that provides fuel at least to its respective engine 140.

Figure 2:
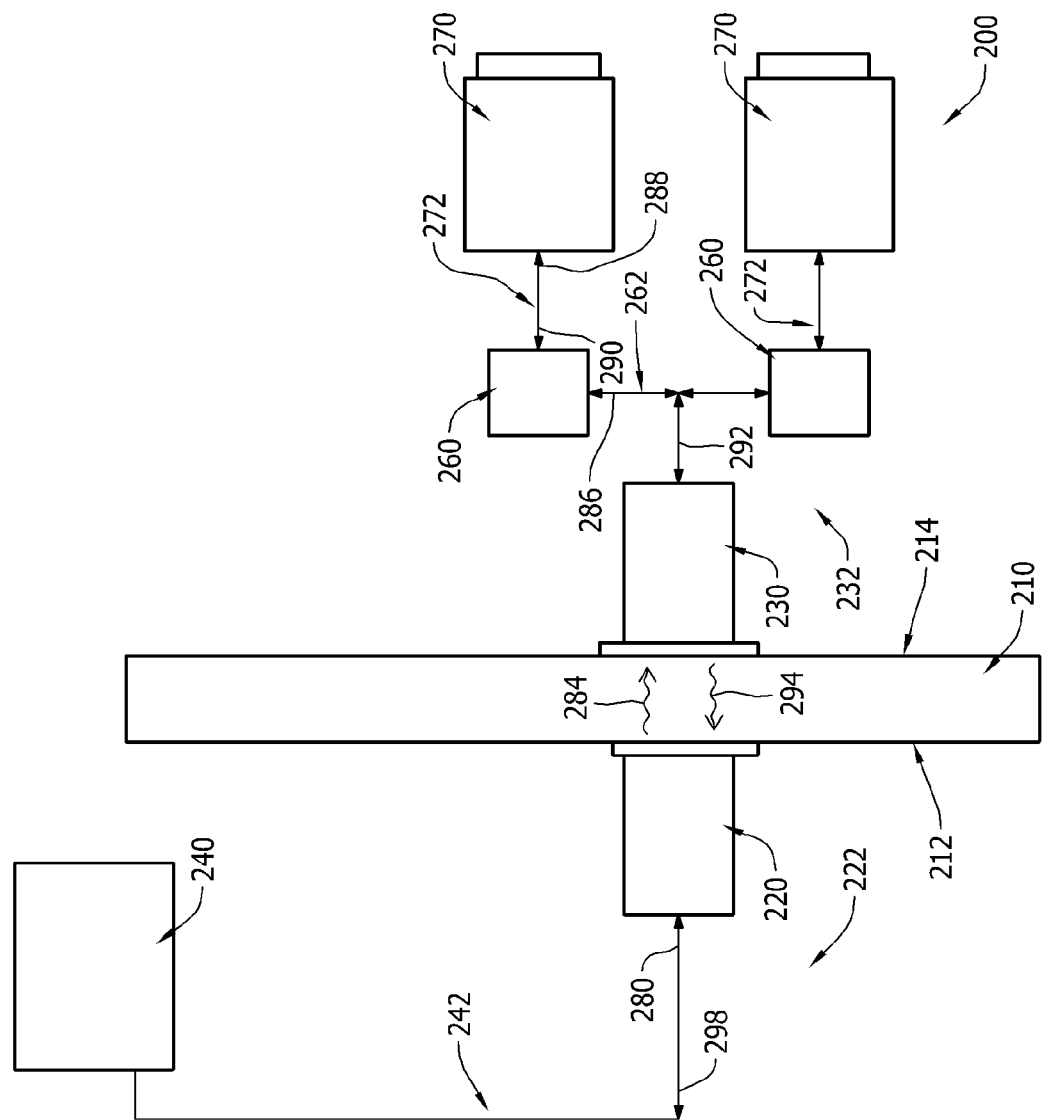
FIG. 2 is a schematic illustration of an exemplary communication system that may be used with the aircraft shown in FIG. 1.

FIG. 2 is a schematic view of an exemplary communication system 200 that may be used to communicate across and/or through a barrier 210 that includes an outer or first surface 212 and an inner or second surface 214. In one embodiment, barrier 210 is a wall of a fuel storage tank that is used to store fuel therein. In the exemplary embodiment, barrier 210 is fabricated from an electrically conductive material and/or from an electromagnetic barrier material and may be used as, for example, a fuel storage tank wall. Alternatively, barrier 210 may be fabricated from any material and/or may be any wall that enables communication system 200 to function as described herein.

In the exemplary embodiment, communication system 200 includes a first transducer 220 that is coupled to first surface 212 such that first transducer 220 is positioned external to or on a first side 222 of barrier 210. Moreover, in the exemplary embodiment, communication system 200 includes a second transducer 230 that is coupled to second surface 214 such that second transducer 230 is positioned internal to a second side 232 of barrier 210. More specifically, in the exemplary embodiment, second transducer 230 is generally aligned with first transducer 220 such that power and/or signals are transmittable between transducers 220 and 230 without physically penetrating barrier 210. For example, signal level, pulse frequency, pulse duration and/or pulse sequences may be used to transfer and/or communicate data or information across barrier 210. In the exemplary embodiment, transducers 220 and/or 230 are piezoelectric transducers. Alternatively, transducers 220 and/or 230 may be any device that enables communication system 200 to function as described herein. In the exemplary embodiment, first surface 212 is oriented to generally face first side 222, and second surface 214 is oriented to generally face second side 232.

In the exemplary embodiment, a signal generator 240 is positioned on first side 222 and is coupled to first transducer 220 via a first wiring system 242 extending between signal generator 240 and first transducer 220. In the exemplary embodiment, power and/or signals are transmittable between signal generator 240 and first transducer 220 through first wiring system 252.

In the exemplary embodiment, at least one controller 260 is positioned on second side 232 and is coupled to second transducer 230 via a second wiring system 262. In the exemplary embodiment, controller 260 is configured to store capacitive energy. In the exemplary embodiment, power and/or signals are transmittable between second transducer 230 and controller 260 through second wiring system 262. Moreover, in the exemplary embodiment, at least one sensor 270 is positioned on second side 232, and each sensor 270 is coupled to a respective controller 260 via a third wiring system 272. In the exemplary embodiment, sensor 270 is configured to respond to commands received from second transducer 230 and/or receive power provided by controller 260. In the exemplary embodiment, controller 260 is a signal conditioner that enables second transducer 230 to communicate with sensor 270. Alternatively, second transducer 230 is coupled directly to sensor 270. In the exemplary embodiment, power and/or signals are transmittable between controller 260 and sensor 270 through third wiring system 272.

During operation, in the exemplary embodiment, signal generator 240 generates an originating or a first signal 280 and transmits first signal 280 through first wiring system 242 towards first transducer 220. In the exemplary embodiment, first transducer 220 receives first signal 280 and transmits a second signal 284 based on first signal 280 across and/or through barrier 210 towards second transducer 230 without physically penetrating barrier 210. In the exemplary embodiment, second transducer 230 receives second signal 284 and transmits a raw or a third signal 286 based on second signal 284 through second wiring system 262 towards controller 260. In the exemplary embodiment, controller 260 receives third signal 286 and transmits a conditioned or a fourth signal 288 based on third signal 286 through third wiring system 272 and towards sensor 270.

Additionally, in the exemplary embodiment, sensor 270 generates a fifth signal 290 based on a detection (not shown) of sensor 270 and transmits fifth signal 290 through third wiring system 272 and towards controller 260. In the exemplary embodiment, controller 260 receives fifth signal 290 and transmits a sixth signal 292 based on fifth signal 290 through second wiring system 262 towards second transducer 230. In the exemplary embodiment, second transducer 230 receives sixth signal 292 and transmits a seventh signal 294 based on sixth signal 292 across and/or through barrier 210 towards first transducer 220 without physically penetrating barrier 210. In the exemplary embodiment, first transducer 220 receives seventh signal 294 and transmits an eighth signal 298 based on seventh signal 294 through first wiring system 242 towards signal generator 240.

Figure 3:
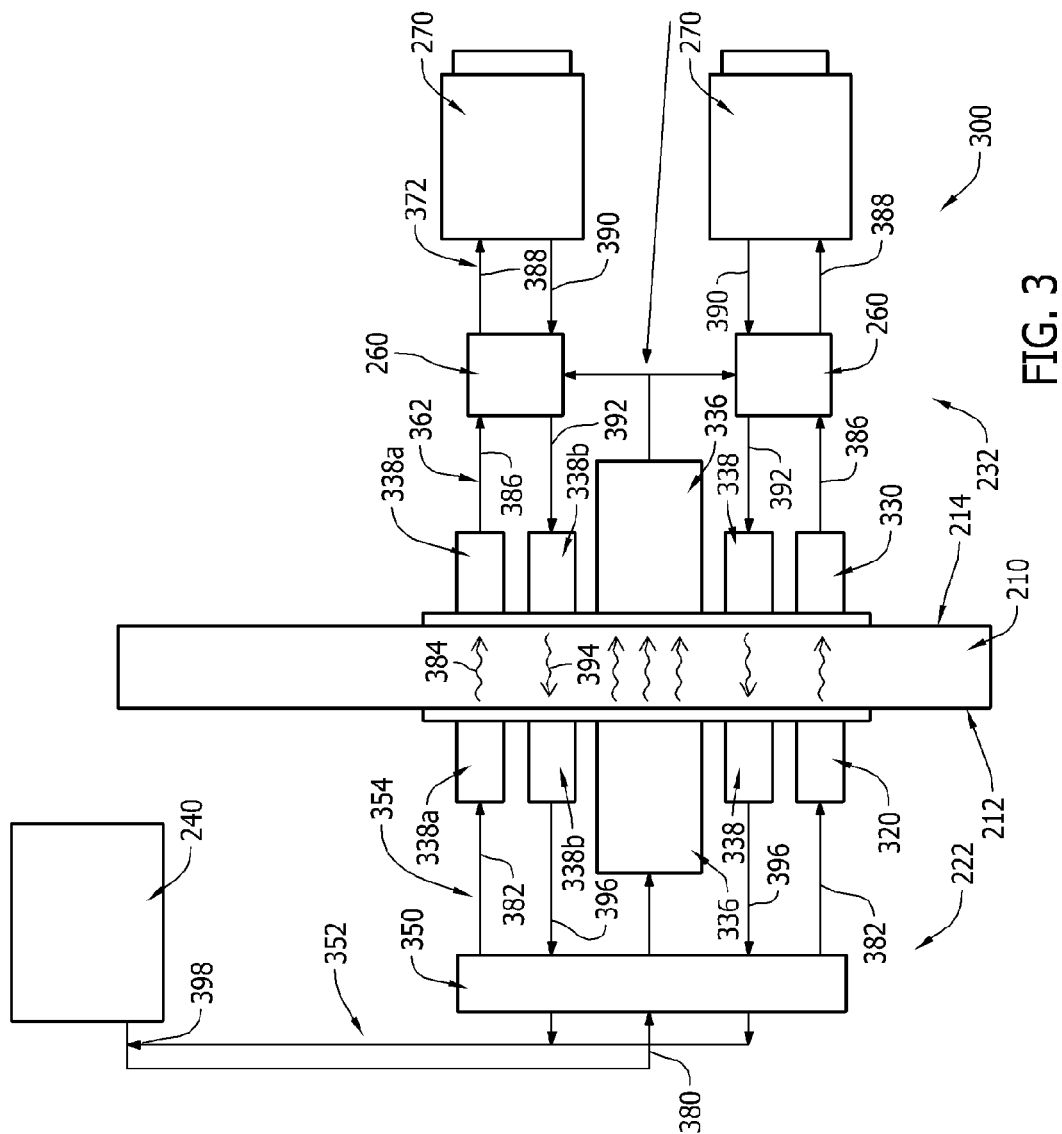
FIG. 3 is a schematic illustration of an alternative communication system that may be used with the aircraft shown in FIG. 1.

FIG. 3 is a schematic view of an alternative communication system 300 that may be used to communicate across and/or through barrier 210. In the exemplary embodiment, communication system 300 includes a plurality of first transducers 320 that are coupled to first surface 212 such that first transducers 320 are positioned on first side 222 of barrier 210. Moreover, in the exemplary embodiment, communication system 300 includes a plurality of second transducers 330 that are coupled to second surface 214 such that second transducers 330 are positioned on second side 232 of barrier 210. More specifically, in the exemplary embodiment, each second transducer 330 is generally aligned with a respective first transducer 320 such that power and/or signals are transmittable between transducers 320 and 330 without physically penetrating barrier 210. For example, signal level, pulse frequency, pulse duration and/or pulse sequences may be used to transfer and/or communicate data or information across barrier 210. In the exemplary embodiment, transducers 320 and/or 330 are piezoelectric transducers. Alternatively, transducers 320 and/or 330 may be any device that enables communication system 300 to function as described herein.

In the exemplary embodiment, transducers 320 and 330 each include an interior transducer 336 and a plurality of peripheral transducers 338 that are arranged circumferentially about interior transducer 336. In the exemplary embodiment, interior transducers 336 are designated to transfer power across and/or through barrier 210. In the exemplary embodiment, the power may be intermittently or continuously transferred across and/or through barrier 210. In the exemplary embodiment, at least one peripheral transducer 338a is designated as an input transducer for use in transmitting signals from first side 222 towards second side 232, and at least one peripheral transducer 338b is designated as an output transducer for use in transmitting signals from second side 232 towards first side 222. Alternatively, any transducer may be used to transfer power and/or signals in any direction that enables communication system 200 to function as described herein.

In the exemplary embodiment, signal generator 240 is coupled to a multiplexer 350 via a first wiring system 352 extending between signal generator 240 and multiplexer 350. In the exemplary embodiment, power and/or signals are transmittable between signal generator 240 and multiplexer 350 through first wiring system 352. Moreover, in the exemplary embodiment, multiplexer 350 is coupled to first transducers 320 via a second wiring system 354. That is, in the exemplary embodiment, multiplexer 350 is a single-input, multiple-output switch (or, for signals transmitted in the opposite direction, multiple-input, single-output switch) that facilitates communication between signal generator 240 and multiple first transducers 320. Alternatively, signal generator 240 is coupled directly to first transducers 320. In the exemplary embodiment, power and/or signals are transmittable between multiplexer 350 and first transducers 320 through second wiring system 354.

In the exemplary embodiment, at least one controller 260 is coupled to second transducers 330 via a third wiring system 362. More specifically, in the exemplary embodiment, each controller 260 is coupled to interior transducer 336, at least one associated input transducer 338a and at least one associated output transducer 338b. In the exemplary embodiment, power and/or signals are transmittable between second transducers 330 and controller 260 through third wiring system 362. Moreover, in the exemplary embodiment, each sensor 270 is coupled to a respective controller 260 via a fourth wiring system 372. In the exemplary embodiment, sensor 270 is configured to respond to commands received from an associated second transducer 330 and/or receive power provided by controller 260. In the exemplary embodiment, power and/or signals are transmittable between controller 260 and sensor 270 through fourth wiring system 372. In one embodiment, a multiplexer (not shown) is positioned on second side 232 to convert multiple signals into a single signal or vice versa. In such an embodiment, the multiplexer facilitates communication between second transducers 330 and sensor 270.

During operation, in the exemplary embodiment, signal generator 240 generates an originating or a first signal 380 and transmits first signal 380 through first wiring system 352 towards multiplexer 350. In the exemplary embodiment, multiplexer 350 receives first signal 380 and transmits a plurality of second signals 382 based on first signal 380 through second wiring system 354 towards first transducers 320. That is, in the exemplary embodiment, each first transducer 320 receives a selected second signal 382 and transmits a third signal 384 based on the respective second signal 382 across and/or through barrier 210 towards an associated second transducer 330 without physically penetrating barrier 210. In the exemplary embodiment, second transducers 330 receive third signals 384 and transmit raw or fourth signals 386 based on third signals 384 through third wiring system 362 towards an associated controller 260. In the exemplary embodiment, each controller 260 receives a respective fourth signal 386 and transmits a conditioned or a fifth signal 388 based on fourth signal 386 through fourth wiring system 372 and towards an associated sensor 270.

Additionally, in the exemplary embodiment, sensors 270 generate sixth signals 390 based on detections (not shown) of sensors 270 and transmit sixth signals 390 through fourth wiring system 372 and towards controllers 260. In the exemplary embodiment, controllers 260 receive sixth signals 390 and transmit seventh signals 392 based on sixth signals 390 through third wiring system 362 towards second transducers 330. In the exemplary embodiment, second transducers 330 receive seventh signals 392 and transmit eighth signals 394 based on seventh signals 392 across and/or through barrier 210 towards first transducers 320 without physically penetrating barrier 210. In the exemplary embodiment, first transducers 320 receive eighth signals 394 and transmit ninth signals 396 based on eighth signals 394 through second wiring system 354 towards multiplexer 350. In the exemplary embodiment, multiplexer 350 receives ninth signals 396 and transmits a tenth signal 398 based on ninth signals 396 through first wiring system 352 towards signal generator 240.

Figure 4:
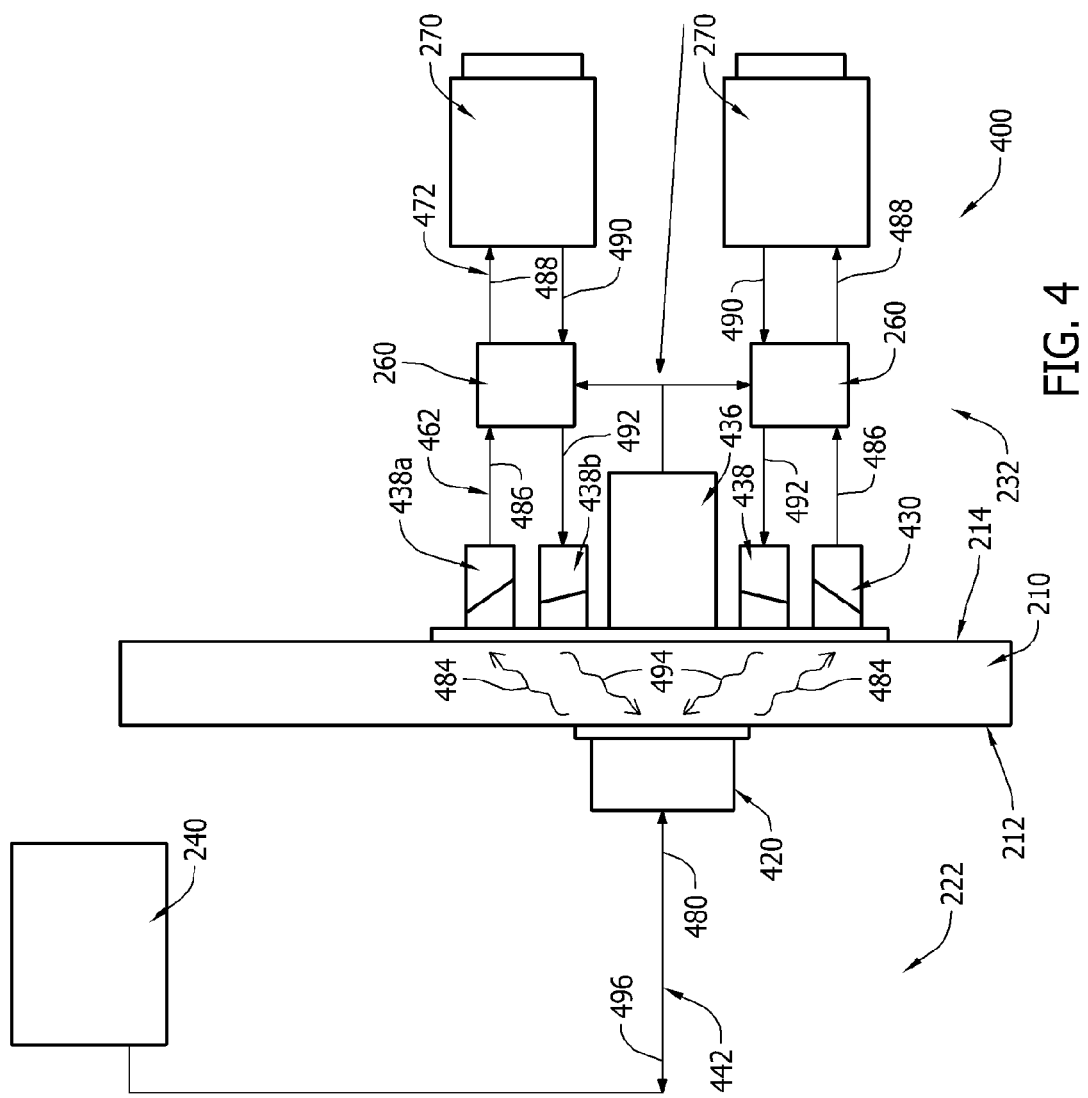
FIG. 4 is a schematic illustration of another alternative communication system that may be used with the aircraft shown in FIG. 1.

FIG. 4 is a schematic view of another alternative communication system 400 that may be used to communicate across and/or through barrier 210. In the exemplary embodiment, communication system 400 includes a first transducer 420 that is coupled to first surface 212 such that first transducer 420 is positioned on first side 222 of barrier 210. Moreover, in the exemplary embodiment, communication system 400 includes a plurality of second transducers 430 that are coupled to second surface 214 such that second transducer 230 is positioned on second side 232 of barrier 210. More specifically, in the exemplary embodiment, first transducer 420 is a transducer array that is steerable such that power and/or signals are transmittable between transducers 420 and 430 without physically penetrating barrier 210. For example, signal level, pulse frequency, pulse duration and/or pulse sequences may be used to transfer and/or communicate data or information across barrier 210. In the exemplary embodiment, transducers 420 and/or 430 are piezoelectric transducers. Alternatively, transducers 420 and/or 430 may be any device that enables communication system 400 to function as described herein.

In the exemplary embodiment, second transducers 430 include an interior transducer 436 and a plurality of peripheral transducers 438 that are arranged circumferentially about interior transducer 436. In the exemplary embodiment, interior transducer 436 is designated to transfer power across and/or through barrier 210. In the exemplary embodiment, the power may be intermittently or continuously transferred across and/or through barrier 210. In the exemplary embodiment, at least one peripheral transducer 438a is designated as an input transducer for use in transmitting signals from first side 222 towards second side 232, and at least one peripheral transducer 438b is designated as an output transducer for use in transmitting signals from second side 232 towards first side 222. Alternatively, any transducer may be used to transfer power and/or signals in any direction that enables communication system 200 to function as described herein.

In the exemplary embodiment, signal generator 240 is coupled to first transducer 420 via a first wiring system 442 extending between signal generator 240 and first transducer 420. In the exemplary embodiment, power and/or signals are transmittable between signal generator 240 and first transducer 420 through first wiring system 442.

In the exemplary embodiment, at least one controller 260 is coupled to second transducers 430 via a second wiring system 462. More specifically, in the exemplary embodiment, each controller 260 is coupled to interior transducer 436, at least one associated input transducer 438a and at least one associated output transducer 438b. In the exemplary embodiment, power and/or signals are transmittable between second transducers 430 and controller 260 through second wiring system 462. Moreover, in the exemplary embodiment, each sensor 270 is coupled to a respective controller 260 via a third wiring system 472. In the exemplary embodiment, sensor 270 is configured to respond to commands received from an associated second transducer 430 and/or receive power provided by controller 260. In the exemplary embodiment, power and/or signals are transmittable between controller 260 and sensor 270 through third wiring system 472.

During operation, in the exemplary embodiment, signal generator 240 generates an originating or a first signal 480 and transmits first signal 480 through first wiring system 442 towards first transducer 420. In the exemplary embodiment, first transducer 420 receives first signal 480 and transmits second signals 484 based on first signals 480 across and/or through barrier 210 towards second transducers 430 without physically penetrating barrier 210. In the exemplary embodiment, second transducers 430 receive second signals 484 and transmit raw or third signals 486 based on second signals 484 through second wiring system 462 towards an associated controller 260. In the exemplary embodiment, each controller 260 receives a respective third signal 486 and transmits a conditioned or a fourth signal 488 based on third signal 486 through third wiring system 472 and towards an associated sensor 270.

Additionally, in the exemplary embodiment, sensors 270 generate fifth signals 490 based on detections (not shown) of sensors 270 and transmit fifth signals 490 through third wiring system 472 and towards controllers 260. In the exemplary embodiment, controllers 260 receive fifth signals 490 and transmit sixth signals 492 based on fifth signals 490 through second wiring system 462 towards second transducers 430. In the exemplary embodiment, second transducers 430 receive sixth signals 492 and transmit seventh signals 494 based on sixth signals 492 across and/or through barrier 210 towards first transducers 420 without physically penetrating barrier 210. In the exemplary embodiment, first transducers 420 receive seventh signals 494 and transmit eighth signals 496 based on seventh signals 494 through second wiring system 462 towards signal generator 240.

Figure 5:
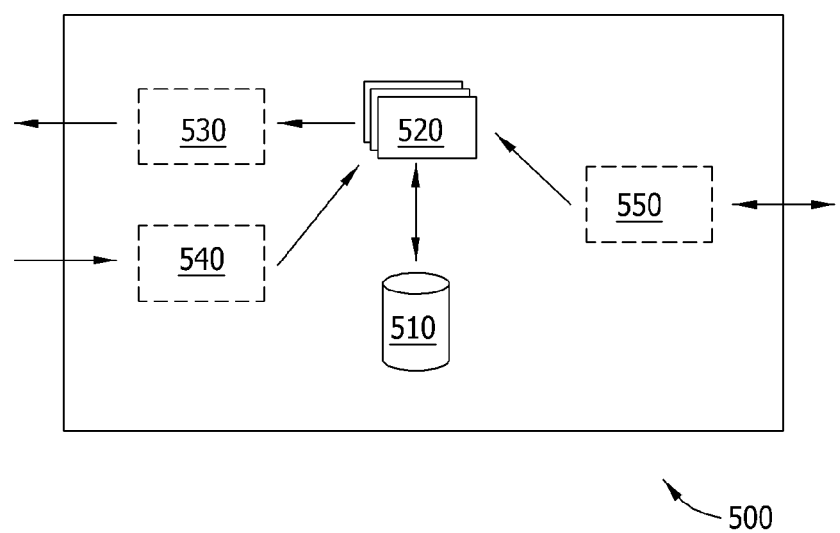
FIG. 5 is a schematic illustration of an exemplary computing device that may be used with the communications systems shown in FIGS. 2-4.

FIG. 5 is a schematic illustration of an exemplary computing device 500 that may be used with communication systems 200, 300 and/or 400 (shown in FIGS. 2, 3, and 4, respectively). In the exemplary embodiment, computing device 500 includes a memory device 510 and a processor 520 coupled to memory device 510 for use in executing instructions. More specifically, in the exemplary embodiment, computing device 500 is configurable to perform one or more operations described herein by programming memory device 510 and/or processor 520. For example, processor 520 may be programmed by encoding an operation as one or more executable instructions and by providing the executable instructions in memory device 510.

Processor 520 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit and other programmable circuits.

In the exemplary embodiment, memory device 510 includes one or more devices (not shown) that enable information such as executable instructions and/or other data to be selectively stored and retrieved. In the exemplary embodiment, such data may include, but is not limited to, signal levels, pulse frequencies, pulse durations, pulse sequences, operational data and/or control algorithms. Memory device 510 may also include one or more computer readable media, such as, without limitation, dynamic random access memory (DRAM), static random access memory (SRAM), a solid state disk and/or a hard disk.

In the exemplary embodiment, computing device 500 includes a presentation interface 530 that is coupled to processor 520 for use in presenting information to a user. For example, presentation interface 530 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display and/or a printer. In some embodiments, presentation interface 530 includes one or more display devices.

Computing device 500, in the exemplary embodiment, includes an input interface 540 for receiving input from the user. For example, in the exemplary embodiment, input interface 540 receives information suitable for use with the methods described herein. Input interface 540 is coupled to processor 520 and may include, for example, a joystick, a keyboard, a pointing device, a mouse, a stylus, a touch sensitive panel (e.g., a touch pad or a touch screen) and/or a position detector. It should be noted that a single component, for example, a touch screen, may function as both presentation interface 530 and as input interface 540.

In the exemplary embodiment, computing device 500 includes a communication interface 550 that is coupled to processor 520. In the exemplary embodiment, communication interface 550 communicates with at least one remote device, such as transducers 220, 230, 320, 330, 420 and/or 430 (shown in FIGS. 2, 3, and 4). For example, communication interface 550 may use, without limitation, a wired network adapter, a wireless network adapter and/or a mobile telecommunications adapter. A network (not shown) used to couple computing device 500 to the remote device may include, without limitation, the Internet, a local area network (LAN), a wide area network (WAN), a wireless LAN (WLAN), a mesh network and/or a virtual private network (VPN) or other suitable communication means.

The embodiments described herein relate generally to communication systems and, more particularly, to methods and systems for use in transferring data and/or power through electromagnetic barriers and/or conductive surfaces. The embodiments described herein enable information to be transferred via acoustic waves and, as such, facilitate reducing potential leak paths for fluids, electromagnetic radiation and/or fuel ignition sources. Additionally, the embodiments described herein facilitate decreasing maintenance costs and/or increasing an overall reliability of the structure.

Exemplary embodiments of methods and systems for transferring data and/or power through electromagnetic barriers and/or conductive surfaces are described herein. The methods and systems are not limited to the specific embodiments described herein, but rather, components of systems and/or steps of the method may be utilized independently and separately from other components and/or steps described herein. Each method step and/or each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in communicating through an electromagnetic barrier that includes a first surface and an opposing second surface, said method comprising:
coupling a plurality of first transducers to the first surface, the plurality of first transducers including a first interior transducer and a plurality of first peripheral transducers spaced circumferentially about the first interior transducer;

coupling a plurality of second transducer to the second surface, the plurality of second transducers including a second interior transducer and a plurality of second peripheral transducers spaced circumferentially about the second interior transducer, wherein the plurality of first peripheral transducers and the plurality of second peripheral transducers include at least one input transducer configured to operate only in a transmit mode by transmitting signals from the first surface to the second surface and at least one output transducer configured to operate only in a receive mode by receiving signals transmitted from the second surface to the first surface, wherein at least one of the plurality of second peripheral transducers is selectively steerable to communicate signals between the plurality of second peripheral transducers and multiple transducers of the plurality of first transducers, and wherein the first interior transducer includes an array of transducers that are each oriented to communicate with at least one of the plurality of second transducers; and transmitting a signal between at least one of the plurality of first transducers and the at least one second transducer without physically penetrating the electromagnetic barrier.

2. A method in accordance with claim 1 further comprising transmitting a first signal from a signal generator positioned on a first side of the electromagnetic barrier towards the plurality of first transducers, the signal transmitted between the plurality of first transducers and the at least one second transducer associated with the first signal.

3. A method in accordance with claim 1 further comprising:
transmitting an originating signal from a signal generator positioned on a first side of the electromagnetic barrier towards a multiplexer positioned on the first side of the electromagnetic barrier; and
transmitting a selected signal from the multiplexer towards the at least one first transducer, the selected signal associated with the originating signal, the signal transmitted between the at least one first transducer and the at least one second transducer associated with the selected signal.

4. A method in accordance with claim 1 further comprising transmitting a conditioned signal from the at least one second transducer towards a sensor positioned on a second side of the electromagnetic barrier, the conditioned signal associated with the signal transmitted between the at least one first transducer and the at least one second transducer.

5. A method in accordance with claim 1 further comprising:
transmitting a raw signal from the at least one second transducer towards a controller positioned on a second side of the electromagnetic barrier, the raw signal associated with the signal transmitted between the at least one first transducer and the at least one second transducer; and
transmitting a conditioned signal from the controller towards a sensor positioned on the second side of the electromagnetic barrier, the conditioned signal associated with the raw signal.

6. A method in accordance with claim 1, wherein the array of transducers includes a steerable transducer array, said method further comprising selectively steering at least one transducer of the array of transducers such that the at least one transducer is oriented to transmit the signal towards the at least one second transducer.

7. A communication device for use in communicating through an electromagnetic barrier that includes a first surface and an opposing second surface, said communication device comprising:
a plurality of first transducers coupled to the first surface, said plurality of first transducers including a first interior transducer and a plurality of first peripheral transducers spaced circumferentially about said first interior transducer; and
a plurality of second transducers coupled to the second surface, said plurality of second transducers including a second interior transducer and a plurality of second peripheral transducers spaced circumferentially about said second interior transducer, wherein said plurality of first peripheral transducers and said plurality of second peripheral transducers include at least one input transducer configured to operate only in a transmit mode by transmitting signals from the first surface to the second surface and at least one output transducer configured to operate only in a receive mode by receiving signals transmitted from the second surface to the first surface, wherein at least one of said plurality of second peripheral transducers is selectively steerable to communicate signals between said plurality of second peripheral transducers and multiple transducers of said plurality of first transducers, and wherein said first interior transducer comprises an array of transducers that are each oriented to communicate with at least one of said plurality of second transducers, such that a signal is transmitted between at least one of said plurality of first transducers and said at least one second transducer without physically penetrating the electromagnetic barrier.

8. A communication device in accordance with claim 7 further comprising a signal generator positioned on a first side of the electromagnetic barrier and configured to transmit a first signal towards said plurality of first transducers, the signal transmitted between the plurality of first transducers and the at least one second transducer associated with the first signal.

9. A communication device in accordance with claim 7 further comprising:
a signal generator positioned on a first side of the electromagnetic barrier; and
a multiplexer positioned on the first side of the electromagnetic barrier, said signal generator configured to transmit a first signal towards said multiplexer, said multiplexer configured to transmit a selected signal towards said at least one first transducer, the selected signal associated with the first signal, the signal transmitted between said at least one first transducer and said at least one second transducer associated with the selected signal.

10. A communication device in accordance with claim 7 further comprising a sensor positioned on a second side of the electromagnetic barrier and oriented to receive a conditioned signal from said at least one second transducer, the conditioned signal associated with the signal transmitted between the at least one first transducer and the at least one second transducer.

11. A communication device in accordance with claim 7 further comprising:
a controller positioned on a second side of the electromagnetic barrier and oriented to receive a raw signal from said at least one second transducer, the raw signal associated with the signal transmitted between the at least one first transducer and the at least one second transducer; and a sensor positioned on the second side of the electromagnetic barrier and oriented to receive a conditioned signal from said controller, the conditioned signal associated with the raw signal.

12. A communication device in accordance with claim 11, wherein said controller is configured to store capacitive energy.

13. A communication device in accordance with claim 7, wherein said array of transducers comprises a steerable transducer array.

14. A system comprising:

an electromagnetic barrier including a first surface and an opposing second surface;

a plurality of first transducers coupled to said first surface, said plurality of first transducers including a first interior transducer and a plurality of first peripheral transducers spaced circumferentially about said first interior transducer; and a plurality of second transducers coupled to said second surface, said plurality of second transducers including a second interior transducer and a plurality of second peripheral transducers spaced circumferentially about said second interior transducer, wherein said plurality of first peripheral transducers and said plurality of second peripheral transducers include at least one input transducer configured to operate only in a transmit mode transmitting signals from said first surface to said second surface and at least one output transducer configured to operate only in a receive mode by receiving signals transmitted from said second surface to said first surface, wherein at least one of said plurality of second peripheral transducers is selectively steerable to communicate signals between said plurality of second peripheral transducers and multiple transducers of said plurality of first transducers, and wherein said first interior transducer comprises an array of transducers that are each oriented to communicate with at least one of said plurality of second transducers, such that a signal is transmitted between at least one of said plurality of first transducers and said at least one second transducer without physically penetrating said electromagnetic barrier.

15. A system in accordance with claim 14 further comprising a signal generator positioned on a first side of the electromagnetic barrier and configured to transmit a first signal towards said plurality of first transducers, the signal transmitted between the plurality of first transducers and the at least one second transducer associated with the first signal.

16. A system in accordance with claim 14 further comprising:

a signal generator positioned on a first side of the electromagnetic barrier; and a multiplexer positioned on the first side of the electromagnetic barrier, said signal generator configured to transmit a first signal towards said multiplexer, said multiplexer configured to transmit a selected signal towards said at least one first transducer, the selected signal associated with the first signal, the signal transmitted between said at least one first transducer and said at least one second transducer associated with the selected signal.

17. A system in accordance with claim 14 further comprising a sensor positioned on a second side of the electromagnetic barrier and oriented to receive a conditioned signal from said at least one second transducer, the conditioned signal associated with the signal transmitted between the at least one first transducer and the at least one second transducer.

18. A system in accordance with claim 14 further comprising:

a controller coupled to said at least one second transducer and positioned on a second side of said electromagnetic barrier; and a sensor coupled to said controller and positioned on said second side of said electromagnetic barrier.

19. A system in accordance with claim 14, wherein the signal is an acoustic wave.

20. A system in accordance with claim 14, wherein said array of transducers comprises a steerable transducer array.

* * * * *